United States Patent
Beatty et al.

(10) Patent No.: US 9,840,580 B2
(45) Date of Patent: Dec. 12, 2017

(54) COPOLYETHER ESTER POLYOL PROCESS

(71) Applicant: INVISTA TECHNOLOGIES S.A.R.L., St. Gallen (CH)

(72) Inventors: Richard P. Beatty, Newark, DE (US); Qun Sun, Wilmington, DE (US)

(73) Assignee: INVISTA North America S.a r.l., Wilmington, DE (US)

( * ) Notice: Subject to any disclaimer, the term of this patent is extended or adjusted under 35 U.S.C. 154(b) by 0 days.

(21) Appl. No.: 15/108,486

(22) PCT Filed: Jan. 5, 2015

(86) PCT No.: PCT/US2015/010145
§ 371 (c)(1),
(2) Date: Jun. 27, 2016

(87) PCT Pub. No.: WO2015/103533
PCT Pub. Date: Jul. 9, 2015

(65) Prior Publication Data
US 2016/0319067 A1    Nov. 3, 2016

Related U.S. Application Data

(60) Provisional application No. 61/923,980, filed on Jan. 6, 2014.

(51) Int. Cl.
| C08G 65/30 | (2006.01) |
| C08G 63/672 | (2006.01) |
| C08G 65/332 | (2006.01) |
| C08G 65/20 | (2006.01) |
| C08G 65/26 | (2006.01) |

(52) U.S. Cl.
CPC .......... *C08G 63/672* (2013.01); *C08G 65/20* (2013.01); *C08G 65/2696* (2013.01); *C08G 65/30* (2013.01); *C08G 65/3322* (2013.01)

(58) Field of Classification Search
CPC .. C08G 65/20; C08G 63/672; C08G 65/2696; C08G 65/30; C08G 65/3322
See application file for complete search history.

(56) References Cited

U.S. PATENT DOCUMENTS

| 3,282,875 A | 11/1966 | James et al. |
| 3,308,069 A | 3/1967 | Wadlinger et al. |
| 3,702,886 A | 11/1972 | Argauer et al. |
| 4,139,567 A | 2/1979 | Pruckmayr |
| 4,153,786 A | 5/1979 | Pruckmayr |
| 4,163,115 A | 7/1979 | Heinsohn et al. |
| 4,439,409 A | 3/1984 | Puppe et al. |
| 4,658,065 A | 4/1987 | Aoshima et al. |
| 4,826,667 A | 5/1989 | Zones et al. |
| 4,954,325 A | 9/1990 | Rubin et al. |
| 5,001,166 A | 3/1991 | Mafoti |
| 5,053,553 A | 10/1991 | Dorai |
| 5,118,869 A | 6/1992 | Dorai et al. |
| 5,149,862 A | 9/1992 | Dorai et al. |
| 5,236,575 A | 8/1993 | Bennett et al. |
| 5,250,277 A | 10/1993 | Kresge et al. |
| 5,282,929 A | 2/1994 | Dorai et al. |
| 5,362,697 A | 11/1994 | Fung et al. |
| 6,194,503 B1 | 2/2001 | Muller |
| 6,197,979 B1 | 3/2001 | Becker et al. |
| 8,609,805 B2 * | 12/2013 | Sun ........................ C08G 65/10 526/64 |

FOREIGN PATENT DOCUMENTS

| DE | 44 33 606 A1 | 3/1996 |
| DE | 196 41 481 A1 | 4/1998 |
| DE | 196 49 803 A1 | 7/1998 |
| EP | 0158229 A1 | 10/1985 |
| EP | 0353768 A2 | 2/1990 |
| EP | 0385428 A2 | 9/1990 |
| EP | 0492807 A2 | 7/1992 |
| WO | 03/031491 A1 | 4/2003 |
| WO | 2011/071502 A1 | 6/2011 |
| WO | 2011/075177 A1 | 6/2011 |
| WO | 2015/103533 A1 | 7/2015 |

OTHER PUBLICATIONS

International Search Report and Written Opinion Received for PCT Application No. PCT/US2015/010145, dated Mar. 23, 2015, 10 pages.
International Preliminary Report on Patentability Report Received for PCT Patent Application No. PCT/US2015/010145, dated Jul. 21, 2016, 8 pages.

* cited by examiner

*Primary Examiner* — Ling Choi
*Assistant Examiner* — Gennadiy Mesh
(74) *Attorney, Agent, or Firm* — Robert B. Furr, Jr.

(57) ABSTRACT

Disclosed is a process for manufacturing copolyether ester polyol comprising: (1) providing feedstock comprising polytetramethylene ether glycol having a number average molecular weight of 350 g/mol or less and an oligomeric cyclic ether content of 4.0% by weight or more and a diacid composition selected from alpha-omega alkanedioic acids of formula $HO_2C—(CH_2)_n—CO_2H$, where n is from 2 through 16 to a reaction zone maintained at reaction conditions to produce a crude polyol product; (2) feeding the crude polyol product of step (1) to a separation zone at separation conditions to produce a first separation product having an oligomeric cyclic ether content of 2.0% by weight or greater, and a second separation product comprising copolyether ester polyol having an oligomeric cyclic ether content of less than 2.0% by weight; and (3) recovering the second separation product.

22 Claims, No Drawings

COPOLYETHER ESTER POLYOL PROCESS

CROSS-REFERENCE TO RELATED APPLICATIONS

This application claims the priority filing date of U.S. Provisional application Ser. No. 61/923,960, filed Jan. 6, 2014, the disclosures of which are specifically incorporated herein by reference in their entireties.

BACKGROUND OF THE INVENTION

Polyols are a class of building block materials that are very useful in making segmented elastomers as the soft segments of the final products. Two common types of polyols are the polyether polyols, such as the polytetramethylene ether glycol (PTMEG), and polyester polyols, such as the butanediol adipates. The former have superior hydrolytic resistance and low temperature properties while the later have advantages in mechanical and high temperature properties.

The current process for manufacturing PTMEG produces a co-product stream, oligomers referred to as "T-250 PTMEG", as illustrated by U.S. Pat. No. 5,282,929. The T-250 PTMEG is also referred to as T-250 stream. In addition to T-250 PTMEG, this co-product stream contains undesirable low molecular weight content impurities, for example, oligomeric cyclic ether (OCE), cyclic esters, etc. OCE has a similar boiling point to the T-250 PTMEG. Normal separation mechanisms, such as vacuum distillation, are not commercially effective for separating and removing the OCE from these co-products because of the similar volatilities. The majority of such co-product streams are presently depolymerized to recover tetrahydrofuran (THF) due to their very high OCE content, e.g., ≥4.0 wt %. These OCE-containing co-products are not suitable for use in most valuable polyol applications. Since they do not react with other reagents, the OCE impurities may not be chemically incorporated into the backbone of desired products and could escape to the surface of the final products. This causes serious commercial issues such as blooming, oiling surface, fogging of adjacent surfaces, and other problems. Therefore, it is highly desirable to have polyols with very low OCE content.

PTMEG homopolymers (THF homopolymers) impart superior dynamic properties to polyurethane elastomers and fibers. Copolymers of THF and at least one cyclic ether, also known as copolyether glycols, are known for use in similar applications, particularly where the reduced crystallinity imparted by the cyclic ether may improve certain dynamic properties of a polyurethane which contains such a copolymer as a soft segment. Among the cyclic ethers used for this purpose are ethylene oxide and propylene oxide.

Preparation of copolymers of THF and cyclic ether is disclosed, for example, by Pruckmayr in U.S. Pat. No. 4,139,567 and U.S. Pat. No. 4,153,786. Such copolymers can be prepared by any of the known methods of cyclic ether polymerization, described for instance in "Polytetrahydrofuran" by P. Dreyfuss (Gordon & Breach, N.Y. 1982). Such polymerization methods include catalysis by strong protonic or Lewis acids, by heteropoly acids, acidic clays, as well as by perfluorosulfonic acids or acid resins. In some instances it may be advantageous to use a polymerization promoter, such as a carboxylic acid anhydride, as disclosed in U.S. Pat. No. 4,163,115. In these cases the primary polymer products are diesters, which need to be hydrolyzed in a subsequent step to obtain the desired polyether glycols.

U.S. Pat. No. 5,053,553 discloses a process for preparing a narrow molecular weight distribution (MWD) PTMEG by solvent fractionation using a ternary solvent system, i.e., methanol, cyclohexane and water. When a PTMEG with normal, broader MWD was treated with the ternary solvent system, it could be split into a hydrocarbon rich layer that contains higher molecular weight PTMEG while the water rich phase has a lower molecular weight PTMEG fraction. After removal of the solvents, PTMEG fractions having higher and lower molecular weight and narrower MWD than the starting material are obtained. U.S. Pat. No. 6,194,503 discloses the same ternary solvent system for fractionating PTMEG into parts with narrower MWD and it was noticed that the majority of the OCE in the starting material ended up in the hydrocarbon rich phase. As expected, the solvent fractionation method is capital and labor intensive.

U.S. Pat. No. 5,001,166 discloses the preparation of copolyether ester polyols using normal PTMEG, for example, having a molecular weight of 690 g/mol, by reacting it with adipic acid.

International Application Publication No. WO 2003/031491 A1 describes preparation of copolyether ester polyols from adipic acid, 1,4-butylene glycol and PTMEG, but does not address the problem of OCE impurities and does not provide any means to remove OCE impurities. OCE impurities present in the PTMEG ingredient remain in the polyol product.

None of the above publications teaches a process for manufacturing copolyether ester polyol having an oligomeric cyclic ether content of less than about 2.0% by weight, as described in the disclosed process. A very much needed simple economical process for manufacturing such a copolyether ester polyol is provided by the disclosed process.

SUMMARY OF THE INVENTION

One aspect of the disclosed process is directed to a process for manufacturing copolyether ester polyol comprising: (1) providing feedstock comprising polytetramethylene ether glycol having a number average molecular weight of 350 g/mol or less and an oligomeric cyclic ether content of about 4.0% by weight or more and a diacid composition to a reaction zone maintained at reaction conditions to produce a crude polyol product; (2) feeding the crude polyol product of step (1) to a separation zone at separation conditions to produce a first separation product having an oligomeric cyclic ether content of 2.0% by weight or greater, and a second separation product comprising copolyether ester polyol having an oligomeric cyclic ether content of less than about 2.0% by weight; and (3) recovering the second separation product.

Another aspect of the disclosed process is directed to a process for manufacturing copolyether ester polyol comprising: (1) providing feedstock comprising polytetramethylene ether glycol having a number average molecular weight of 300 g/mol or less and an oligomeric cyclic ether content of from about 4.0 to about 10% by weight and a diacid composition selected from alpha-omega alkanedioic acids of formula $HO_2C-(CH_2)_n-CO_2H$, where n is from 2 through 16, to a reaction zone maintained at reaction conditions to produce a crude polyol product; (2) feeding the crude polyol product of step (1) to a separation zone at separation conditions to produce a first separation product having an oligomeric cyclic ether content of 2.0% by weight or greater, and a second separation product comprising copolyether ester polyol having an oligomeric cyclic ether content of from about 0.01 to about 1.8% by weight; and (3) recovering the second separation product.

DETAILED DESCRIPTION OF THE INVENTION

One aspect of the disclosed process is directed to a process for manufacturing copolyether ester polyol comprising: (1) providing feedstock comprising polytetramethylene ether glycol having a number average molecular weight of 350 g/mol or less and an oligomeric cyclic ether content of about 4.0% by weight or more and a diacid composition to a reaction zone maintained at reaction conditions to produce a crude polyol product; (2) feeding the crude polyol product of step (1) to a separation zone at separation conditions to produce a first separation product having an oligomeric cyclic ether content of 2.0% by weight or greater, and a second separation product comprising copolyether ester polyol having an oligomeric cyclic ether content of less than about 2.0% by weight; and (3) recovering the second separation product.

As a result of intense research in view of the above, we have discovered a simple economical process whereby we can manufacture copolyether ester polyol having an oligomeric cyclic ether content of less than about 2.0% by weight, for example from about 0.01 to about 1.8% by weight, from feedstock comprising polytetramethylene ether glycol having a number average molecular weight of 350 g/mol or less, such as 300 g/mol or less, for example from about 200 to about 300 g/mol, and an oligomeric cyclic ether content of 4.0% by weight or more, such as from about 4.0 to about 10.0% by weight, for example from about 4.0 to about 8.0% by weight.

The term "polymerization", as used herein, unless otherwise indicated, includes the term "copolymerization" within its meaning.

The term "PTMEG", as used herein, unless otherwise indicated, means polytetramethylene ether glycol (CAS No. 25190-06-1). PTMEG is also known as polyoxybutylene glycol or poly(tetrahydrofuran) or PTMG. PTMEG is represented by a molecular formula: $H(OCH_2CH_2CH_2CH_2)_n OH$, wherein n is a numerical value between 1 to 100.

The term "copolyether glycol", as used herein in the singular, unless otherwise indicated, means copolymers of tetrahydrofuran and at least one alkylene oxide, which are also known as polyoxybutylene polyoxyalkylene glycols. An example of a copolyether glycol is a copolymer of tetrahydrofuran and ethylene oxide. This copolyether glycol is also known as poly(tetramethylene-co-ethyleneether)glycol.

The term "THF", as used herein, unless otherwise indicated, means tetrahydrofuran and includes within its meaning alkyl substituted tetrahydrofuran, for example 2-methyltetrahydrofuran, 3-methyltetrahydrofuran, and 3-ethyltetrahydrofuran. The term "tetrahydrofuran" as used herein includes within its meaning alkyl substituted tetrahydrofuran, for example 2-methyltetrahydrofuran, 3-methyltetrahydrofuran, and 3-ethyltetrahydrofuran.

The term "alkylene oxide", as used herein, unless otherwise indicated, means a compound containing two, three or four carbon atoms in its alkylene oxide ring. The alkylene oxide can be unsubstituted or substituted with, for example, linear or branched alkyl of 1 to 6 carbon atoms, or aryl which is unsubstituted or substituted by alkyl and/or alkoxy of 1 or 2 carbon atoms, or halogen atoms such as chlorine or fluorine. Examples of such compounds include ethylene oxide (EO); 1,2-propylene oxide; 1,3-propylene oxide; 1,2-butylene oxide; 1,3-butylene oxide; 2,3-butylene oxide; styrene oxide; 2,2-bis-chloromethyl-1,3-propylene oxide; epichlorohydrin; perfluoroalkyl oxiranes, for example (1H, 1H-perfluoropentyl) oxirane; and combinations thereof.

The term "copolyether ester polyol" as used herein, unless otherwise indicated, means a polyol containing both ester and ether linkages. Such polyols contain two or more hydroxyl groups. An example of such a polyol is a polyester prepared by condensation of a diacid with one or more polyether glycols (e.g., PTMEG or a copolyether glycol) and, optionally, one or more diols (e.g., 1,4-butylene glycol, ethylene glycol, 1,2- or 1,3-propanediol, neopentyl glycol, or a combination thereof).

The term "oligomeric cyclic ether" or "OCE," as used herein in the singular, unless otherwise indicated, means one or more of the series of cyclic compounds comprised of constituent ether fragments derived from at least one alkylene oxide and/or THF and arranged in a random fashion within the cyclic compound. In some embodiments, OCE means one or more of the series of cyclic compounds comprised of constituent ether fragments derived from THF. In other embodiments, OCE refers to the distribution of cyclic ethers formed during polymerization of the TRF and at least one alkylene oxide and thus refers to a series of individual compounds. In a further embodiment, OCE excludes the dimer of the alkylene oxide co-monomer used in the polymerization, even though such a dimer is an example of cyclic ether. For example, in the case where the alkylene oxide is ethylene oxide, the dimer of the alkylene oxide is 1,4-dioxane. In the case of copolymerization of, for example, ethylene oxide and TBF, OCE comprises the series of cyclic oligomeric ethers comprised of ring-opened ethylene oxide and ring-opened THF repeat units, as represented by the formula: $[(CH_2CH_2O)_x (CH_2CH_2CH_2CH_2CH_2O)_y]_n$.

In some embodiments, the THF used as a reactant in production of PTMEG can be any of those commercially available. Typically, the THF has a water content of less than about 0.03% by weight and a peroxide content of less than about 0.005% by weight. If the THF contains unsaturated compounds, their concentration should be such that they do not have a detrimental effect on the polymerization process of the present invention or the polymerization product thereof. For example, for some applications it is preferred that the copolyether glycol product of the present invention having a high molar concentration of alkylene oxide has low APHA color, such as, for example less than about 100 APHA units. Optionally, the THF can contain an oxidation inhibitor such as butylated hydroxytoluene (BHT) to prevent formation of undesirable byproducts and color. If desired, one or more alkyl substituted THF's capable of copolymerizing with THF can be used as a co-reactant, in an amount from about 0.1 to about 70% by weight of the THF. Examples of such alkyl substituted THF's include 2-methyltetrahydrofuran, 3-methyltetrahydrofuran, and 3-ethyltetrahydrofuran.

In some embodiments, the alkylene oxide used as a reactant in production of copolyether glycol, as above indicated, may be a compound containing two, three or four carbon atoms in its alkylene oxide ring. It may be selected from, for example, the group consisting of ethylene oxide; 1,2-propylene oxide; 1,3-propylene oxide; 1,2-butylene oxide; 2,3-butylene oxide; 1,3-butylene oxide and combinations thereof. Preferably, the alkylene oxide has a water content of less than about 0.03% by weight, a total aldehyde content of less than about 0.01% by weight, and an acidity (as acetic acid) of less than about 0.002% by weight. The alkylene oxide should be low in color and non-volatile residue.

If, for example, the alkylene oxide reactant is EO, it can be any of those commercially available. Preferably, the EO has a water content of less than about 0.03% by weight, a total aldehyde content of less than about 0.01% by weight, and an acidity (as acetic acid) of less than about 0.002% by weight. The E0 should be low in color and non-volatile residue.

Examples of compounds containing reactive hydrogen atoms which are suitable for use in production of PTMEG include water, ethylene glycol, 1,4-butanediol, PTMEG having a molecular weight of from about 162 to about 400 dalton, copolyether glycols having a molecular weight of from about 134 to 400 dalton, and combinations thereof. An example of a suitable copolyether glycol for use as a compound containing reactive hydrogen atoms is poly(tetramethylene-co-ethyleneether) glycol having a molecular weight of from about 134 to about 400 dalton. These compounds could also be used in combination to regulate the molecular weight of the final product.

The acid catalyst useful in production of PTMEG includes broadly any strong acid and super acid catalyst capable of ring-opening polymerization of cyclic ethers as generally known in the art. The catalyst may be homogeneous or heterogeneous. Heterogeneous catalysts may be used in extrudate form or in suspension. The use of a heterogeneous catalyst may facilitate separation of product from the catalyst, especially when the catalyst is used in extrudate form.

Suitable homogeneous acid catalysts for use in production of PTMEG, by way of example but not by limitation, heteropolyacids as disclosed, for example, in U.S. Pat. No. 4,658,065.

Suitable heterogeneous acid catalysts for use in production of PTMEG, by way of example but not by limitation, zeolites optionally activated by acid treatment, sulfate-doped zirconium dioxide, supported catalysts comprising at least one catalytically active oxygen-containing molybdenum and/or tungsten compound or a mixture of such compounds applied to an oxidic support, polymeric catalysts which contain sulfonic acid groups (optionally with or without carboxylic acid groups), and combinations thereof.

Natural or synthetic zeolites, a class of aluminum hydrosilicates (also known as crystalline aluminosilicates), having an open structure of three-dimensional networks with defined pores and channels in the crystal, may be used as heterogeneous acid catalysts in production of PTMEG. Suitable zeolites for use in production of PTMEG have a $SiO_2:Al_2O_3$ molar ratio ranging from about 4:1 to about 100:1, for example from about 6:1 to about 90:1, or from about 10:1 to about 80:1. The particle size of the zeolite may be less than about 0.5 micron, for example less than about 0.1 micron, or less than about 0.05 micron. The zeolites are used in the hydrogen (acid) form and may optionally be activated by acid treatment. The acidified zeolites for use herein are exemplified by faujasite (described in EP-A 492807), zeolite Y, zeolite Beta (described in U.S. Pat. No. 3,308,069), ZSM-5 (described in U.S. Pat. No. 3,702,886), MCM-22 (described in U.S. Pat. No. 4,954,325), MCM-36 (described in U.S. Pat. No. 5,250,277), MCM-49 (described in U.S. Pat. No. 5,236,575), MCM-56 (described in U.S. Pat. No. 5,362,697), PSH-3 (described in U.S. Pat. No. 4,439,409), SSZ-25 (described in U.S. Pat. No. 4,826,667) and the like.

The preparation of sulfate-doped zirconium dioxide is disclosed, for example, in U.S. Pat. No. 5,149,862.

Also useful as heterogeneous catalysts in production of PTMEG are those comprising at least one catalytically active oxygen-containing molybdenum and/or tungsten compound or a mixture of such compounds applied to an oxidic support as disclosed, for example, in U.S. Pat. No. 6,197,979. Examples of suitable oxidic supports include zirconium dioxide, titanium dioxide, hafnium oxide, yttrium oxide, iron (III) oxide, aluminum oxide, tin (IV) oxide, silicon dioxide, zinc oxide or mixture of these oxides. The supported catalysts may be, for example, additionally doped with sulfate or phosphate groups, as disclosed in German patent application DE-A 44 33606, pretreated with a reducing agent as described in DE 196 41481, or calcined and further comprising a promoter comprising at least one element or compound of an element of groups 2, 3 (including the lanthanides), 5, 6, 7, 8, and 14 of the periodic table of the elements, as disclosed in DE 196 49803.

The preferred above mentioned heterogeneous catalysts useful in production of PTMEG, for example, natural or synthetic zeolites, oxidic-supported active oxygen-containing molybdenum and/or tungsten, and zirconium dioxide, are spherical in shape, so that they are more attrition resistant and suitable for use in a continuously stirred tank reactor (CSTR).

Among suitable polymeric catalysts which contain sulfonic acid groups, optionally with or without carboxylic acid groups, useful in production of PTMEG are those whose polymer chains are copolymers of tetrafluoroethylene or chlorotrifluoroethylene and a perfluoroalkyl vinyl ether containing sulfonic acid group precursors (again with or without carboxylic acid groups) as disclosed in U.S. Pat. Nos. 4,163,115 and 5,118,869 and as supplied commercially by E. I. duPont de Nemours and Company under the tradename Nation®. Such polymeric catalysts are also referred to as polymers comprising alpha-fluorosulfonic acids. An example of this type of catalyst for use in production of PTMEG is a perfluorosulfonic acid resin, i.e., it comprises a perfluorocarbon backbone and the side chain is represented by the formula $—O—CF_2CF(CF_3)—O—CF_2CF_2SO_3H$. Polymers of this type are disclosed in U.S. Pat. No. 3,282,875 and can be made by copolymerization of tetrafluoroethylene CITE) and the perfluorinated vinyl ether $CF_2=CF—O—CF_2CF(CF_3)—O—CF_2CF_2SO_2F$, perfluoro (3,6-dioxa-4-methyl-7-octenesulfonyl fluoride) (PDMOF), followed by conversion to sulfonate groups by hydrolysis of the sulfonyl fluoride groups and ion exchanged as necessary to convert them to the desired acidic form. See also U.S. Pat. No. 4,139,567 for a description of perfluorosulfonic acid resin catalyst useful herein.

The polymeric heterogeneous catalysts which can be employed in production of PTMEG can be used in the form of powders or as shaped bodies, for example in the form of beads, cylindrical extrudates, spheres, rings, spirals, or granules. The perfluorosulfonic acid resin type of polymeric heterogeneous catalyst can be pretreated (hydrotreated) by placing it along with deionized water at a weight ratio of resin/water of from about ¼ to about ¹/₁₀ into a clean stainless steel autoclave, heating to a temperature of, for example, from about 170° C. to about 210° C. under agitation, and holding at that temperature for up to about 12 hours, for example from about 1 hour to about 8 hours.

In some embodiments, the polymerization step in production of PTMEG is generally carried out at from about 30° C. to about 80° C., such as from about 50° C. to about 72° C., for example from about 50° C. to about 65° C. The pressure employed is generally from about 200 to about 800 mmHg, for example from about 300 to about 500 mmHg, depending on the diluent or solvent used, if any.

Non-limiting examples of suitable inert gases for use in production of PTMEG include nitrogen, carbon dioxide, or the noble gases.

In some embodiments, the feedstock to step (1) of the present process comprises PTMEG having a number average molecular weight of about 350 g/mol or less, such as about 300 g/mol or less, for example from about 200 to about 300 g/mol, and an OCE content of about 4.0% by weight or more, such as from about 4.0 to about 10.0% by weight, for example from about 4.0 to about 8.0% by weight, a diacid composition hereinafter more particularly described and, optionally, a diol composition hereinafter more particularly described, and further optionally, another glycol hereinafter more particularly described.

In forming a copolyester ether polyol, hydroxyl groups present in the glycol and optional diol ingredients form ester linkages by reaction with carboxylic acid groups present in the diacid. In order to obtain a polyol, the mole ratio of hydroxyl groups to carboxylic acid groups must be greater than 1. The exact molar ratio will depend on the desired polyol molecular weight and the molecular weights of the reactants.

In some embodiments, total moles of hydroxyl per mole carboxylic acid will generally be within the range 1.1 to 1.90 during copolyester ether polyols production of molecular weight 750 to 3000 from T-250 PTMEG and adipic acid (AA) and depending on the desired polyol molecular weight. In some embodiments, the weight ratio of feedstock PTMEG/AA for this same system will generally be within the range 1:1 to 5:1. In a further embodiment, the weight ratio range of PTMEG and AA in the feedstock is from 1.1:1.0 to 3.9:1.0. In another further embodiment, the weight ratio range of PTMEG and AA in the feedstock is from 1.2:1.0 to 3:1. In yet another further embodiment, the weight ratio range of PTMEG and AA in the feedstock is from 1.25:1.0 to 2.5:1. The exact molar and weight ratios will depend on the exact T-250 molecular weight and the polyol molecular weight desired.

In some embodiments, total moles of hydroxyl per mole carboxylic acid will generally be within the range 1.05 to 1.90 in making copolyester ether polyols of molecular weight 750 to 3000 from T-250 PTMEG, 1,4-butanediol (BDO), and AA and depending on the desired polyol molecular weight and the proportions of T-250 and BDO. The weight ratio of feedstock PTMEG/BDO/AA for this same system will generally be within the range 0.02/0.0/1.0 to 5.0/0.5/1.0. In a further embodiment, the weight ratio of feedstock PTMEG/BDO/AA for this same system is within the range 0.1/0.0/1.0 to 4.0/0.5/1.0. In another further embodiment, the weight ratio of feedstock PTMEG/BDO/AA for this same system is within the range 0.2/0.0/1.0 to 3.8/0.5/1.0. In some embodiments, the weight ratio range of PTMEG and AA in the feedstock is from 0.02:1.0 to 5:1. In a further embodiment, the weight ratio range of PTMEG and AA in the feedstock is from 0.1:1.0 to 4:1. In another further embodiment, the weight ratio range of PTMEG and AA in the feedstock is from 0.2:1.0 to 4:1. In yet another further embodiment, the weight ratio range of PTMEG and AA in the feedstock is from 0.5:1.0 to 3.8:1. In another further embodiment, the weight ratio range of PTMEG and AA in the feedstock is from 1:1 to 3:1. In other embodiments, the weight ratio of BDO and AA in the feedstock is no more than 0.5:1.0. In another embodiment, the weight ratio of BDO and AA in the feedstock is no more than 0.4:1.0. In a further embodiment, the weight ratio of BDO and AA in the feedstock is no more than 0.3:1.0. In yet another further embodiment, the weight ratio of BDO and AA in the feedstock is no more than 0.25:1.0. In another embodiment, the weight ratio range of BDO and AA in the feedstock is from 0.1:1.0 to 0.4:1.0. In another further embodiment, the weight ratio range of BDO and AA in the feedstock is from 0.2:1.0 to 0.3:1.0. The exact molar and weight ratios will depend on the polyol molecular weight desired and the proportions of T-250 and BDO employed.

The diacid composition of the feedstock may be selected from the simple alpha-omega alkanedioic acids of formula $HO_2C-(CH_2)_n-CO_2H$ where n may range from 2 through 16, including succinic acid, glutaric acid, adipic acid, pimelic acid, suberic acid, azelaic acid, sebacic acid, undecanedioic acid, dodecanedioic acid, or a combination thereof. Commercially available combinations of diacids may be used, for example INVISTA markets mixtures of succinic, glutaric, and adipic acids as DBA Dibasic Acid and mixtures of mainly $C_{11}$ and $C_{12}$ dicarboxylic acids as Cor-free® M1.

The optional diol composition of the feedstock comprises one or more diols selected from the group of linear, branched, and cyclic primary or secondary diols. Examples of diols include, but are not limited to, linear, alpha-omega alkanediols of formula $HO-(CH_2)_x-OH$ where x may range from 2 through 18, including ethylene glycol, 1,3-propanediol, 1,4-butanediol, 1,5-pentanediol, 1,6-hexanediol, and 1,12-dodecanediol; branched diols such as neopentyl glycol or 2-butyl-2-ethyl-1,3-propanediol, 2,2,4-trimethyl-1,3-pentanediol, 2-ethyl-1,3-hexanediol; cyclic diols such as cyclohexane dimethanol, and glycols such as 1,2-propanediol, 1,2-butanediol, 1,2-pentanediol, and 1,2-hexanediol; or combinations thereof.

The feedstock to step (1) of the process may comprise an optional oligomeric glycol selected from the group consisting of oligomeric ethylene glycols (E series), oligomeric propylene glycols (P series), ethoxylated glycols, or propoxylated glycols including diethylene glycol, triethylene glycol, tetraethylene glycol, dipropylene glycol, tripropylene glycol, and various ethoxylated or propoxylated glycols based on polyfunctional alcohol starters, and combinations thereof.

The feedstock to step (1) of the process may comprise an optional esterification catalyst. Such catalysts are widely known in the art. These catalysts include strong acids such as sulfuric acid or sulfonic acids, for example toluenesulfonic acid or xylenesulfonic acid, or mixtures of sulfonic acids. In addition, various metal-based catalysts may be employed, such as those based on tin or titanium. Specific examples of titanium catalysts include the various catalysts sold by Dorf Ketal under the Tyzor® name, including Tyzor® TPT, TIPT, TPT-20B, TE, TOT, AC 420, AC 422, and LA.

In some embodiments, the reaction of step (1) of the process may be carried out continuously to maintain consistency in the products, or batch wise, i.e., the feed can be prepared in a large batch and reacted continuously until the batch is completed. In other embodiments, the reaction zone of step (1) can be one or more conventional reactors or reactor assemblies suitable for such a process in a homogeneous solution, suspension, or fixed-bed mode, for example in loop reactors or stirred reactors in the case of a suspension process or in tube reactors or fixed-bed reactors in the case of a fixed-bed process, or in stirred tank or tubular reactors, or in multi-stage contactors of various kinds such as trayed columns. In one embodiment, a CSTR may be useful for good mixing in the present process, especially when the products are produced in a single pass mode. In another embodiment, the reactor apparatus can be operated in the upflow fixed-bed process mode, that is, the reaction mixture is conveyed from the bottom upward, or in the downflow mode, that is, the reaction mixture is conveyed through the reactor from the top downward. In some embodiments, multi-stage systems may be used in which reactants are passed through a series of reactors or stages within a single reactor, such as a trayed column or divided multi-stage tank reactor.

Step (1) is a condensation esterification in which carboxylic acid functionality is allowed to react with hydroxyl functionality to form an ester linkage, releasing water. This is an equilibrium reaction and it may be necessary to remove the water of reaction to attain very high conversion. In some embodiments, stripping gas such as nitrogen or superheated steam may optionally be used to more rapidly and completely remove water of reaction to attain high conversion. In other embodiments, dessicants, azeotropic agents, chemical water-scavengers, and other means known to those skilled in the art may optionally be employed for the same purpose of removing water of reaction and attaining high conversion.

The reaction conditions of step (1) of the process include a temperature of from about 100° C. to about 300° C., such as from about 150° C. to about 250° C., for example from about 160° C. to about 200° C., and pressure from about 10 to about 2000 mmHg absolute, such as from about 50 to about 1000 mmHg absolute, for example from about 70 to about 800 mmHg absolute, or from about 100 to about 125 mmHg absolute. The reaction conditions may further include sparging with an inert gas having limited or no chemical activity at reaction conditions, such as, for example, nitrogen, carbon dioxide, or the noble gases.

In some embodiments, feedstock can be introduced to the reaction zone of step (1) using delivery systems common in current engineering practice either batchwise or continuously. In other embodiments, the process involves gravity-feeding or pneumatically-conveying solid reactants into a vessel where they are mixed with liquid reactants to form a reaction mixture for step (1). The slurry can then be subjected to suitable reaction conditions as described above for step (1). In one embodiment, a flexible bulk container ("supersack") of solid adipic acid may be opened and added to a CSTR through an opening on the top of the CSTR. In another embodiment, adipic acid stored in a silo or hopper may be pneumatically-conveyed into the reactor. Liquid reactants may be pumped into the reactor using various pumping devices known in the art. The reactants may be mixed by means known in the art such as mechanical agitators, gas sparging, pump-around loops, and the like.

Reactants are subjected to the reaction conditions of step (1) until the reactants have formed products of the desired quality. For copolyester ether polyols, one of the most critical quality parameters is typically acid number, which is an indication of the residual unreacted acidity of the mixture. Progress of the reaction can be monitored by periodically analyzing acid number. Acid number of the incompletely-reacted mixture of reactants is relatively high, such as above 10 mg KOH/g. The desired acid number of the final reacted mixture or polyol product is typically low, such as below 10 mg KOH/g, or especially below 2 mg KOH/g, and ideally below 1 mg KOH/g. Conditions of step (1) are maintained until the desired acid number is reached.

In some embodiments, the separation zone of step (2) of the present process comprises one or more apparatuses for vacuum distillation or evaporation. Such apparatuses include columns or evaporators, for example, falling film evaporators or thin film evaporators. In other embodiments, it may also be advantageous to use tray or packed columns. Examples of useful apparatuses for the separation zone are a vacuum distillation apparatus comprising a short path distillation (SPD) column, or an evaporation apparatus comprising a wiped film evaporator (WFE).

The separation conditions of step (2) of the process include a temperature of from about 125° C. to about 250° C., such as from about 160° C. to about 230° C., and vacuum from about 0.001 to about 10 mmHg, such as from about 0.0015 to about 5.0 mmHg, from about 0.002 to about 3.0 mmHg.

In some embodiments, Step (3) recovery of the second separation product of step (2) may comprise physically separating it from the first separation product. In other embodiments, the second separation product may be treated to remove or reduce color or turbidity, such as by filtration, centrifugation, or treatment with absorbents such as molecular sieves or activated carbon. The second separation product may optionally be cooled, collected in a storage tank, and transferred into any desired containers for storage, shipping and sales. The second separation product may be mixed with other materials to form a formulation for subsequent use. Such formulations may include prepolymers.

The following Examples demonstrate the present invention and its capability for use. The invention is capable of other and different embodiments, and its several details are capable of modifications in various apparent respects, without departing from the scope and spirit of the present invention. Accordingly, the Examples are to be regarded as illustrative in nature and non-limiting. In the Examples, all parts and percentages are by weight unless otherwise indicated. The determination of acid number, hydroxyl value, compositional measurements, and molecular weight and polydispersity analyses are well-known and commonly practiced in the art of polyols making. The gas chromatography (GC) and Gel-permeation chromatography (GPC) methods, used in the examples, are also well-known and practiced in the field of polyols manufacture.

EXAMPLES

The Tyzor® TPT 20B catalyst used during the esterification reaction is obtained from Dorf Ketal Chemicals, LLC (Stafford, Tex.).

INVISTA Terathane® 250 (also called "T-250 PTMEG"; CAS No. 25190-06-1), as used in Examples 1-4, is a non-commercial grade material with high OCE content. The T-250 PTMEG, as used in Examples 1-4, has a number average molecular weight range of 350 g/gmol or less and an OCE content range of 4.0% by weight or more.

The adipic acid used in the examples is obtained from INVISTA as ADI-PURE® adipic acid (CAS No. 124-04-9). The INVISTA ADI-PURE® adipic acid product specification is given below:

| Specifications | Limit |
|---|---|
| Adipic Acid, wt % (Assay) | 99.7 min. |
| Water, wt % | 0.2 max. |
| Ash, ppm | 2.0 max. |
| Iron, ppm | 0.5 max. |
| Methanol Solution Color, APHA | 4.0 max. |

-continued

| Specifications | Limit |
|---|---|
| Total Nitrogen (TN), mpm* | 15.0 max. |
| ppm | 1.5 max. |

*moles per million moles (mol/10$^6$ mol)

The 1,4-butanediol (CAS No. 110-63-4) used in the examples is obtained from INVISTA and has the following quality specification and properties.

| | | | |
|---|---|---|---|
| Colour, APHA | <10 | Molecular weight | 90.1 |
| Water, wt. % | <0.05 | Hydroxyl number + | 1240-1246 |
| Carbonyl No., mg KOH/g | <0.1 | Viscosity, cP (mPa. · s), 25°/40° C. | 70-73/37-40 |
| Assay, wt. % | >99.5 | Density, 40° C. g/mL (Mg/m3) | 1.014 |
| | | Melting point ++, ° C. | 19-20 |
| | | Boiling point, ° C. | 228 |

+ calculated;
++ freeze point

Example 1

A 2-liter round bottom flask is fitted with a heating mantle, magnetic stir bar, nitrogen sparge tube, and a 5-plate Oldershaw column with distillation head, condenser, and distillate receiver. The flask is charged with a reaction mixture comprising 316 grams adipic acid and 762 grams T-250 PTMEG having a number average molecular weight of 290 g/gmol and an OCE content of 5.1% by weight. The reaction mixture is sparged with nitrogen for 30 minutes, and then heated to 200° C. mixture temperature with continuous nitrogen sparge. Water of reaction is condensed and collected in the overhead distillate receiver. After 6.7 hours, the reaction mixture is sampled and acid number is found to be 14 mg KOH/g. Reaction mixture temperature is adjusted to 167° C. while nitrogen sparge is continued, then 0.2 gram Tyzor® TPT 20B esterification catalyst is added and the reaction mixture temperature is raised to 200° C.

After 9.4 hours total reaction time, pressure is reduced to 122 mmHg while the mixture temperature is maintained at 200° C. After 14.8 hours total reaction time, acid number is measured to be 0.34 mg KOH/g. The Oldershaw column is then removed and reaction mixture temperature is adjusted to 165° C. while nitrogen sparge is continued, then 0.05 gram Tyzor® TPT 20B catalyst is added. Nitrogen sparge is continued while the reaction mixture is heated to 200° C. and pressure is reduced and maintained between 100-120 mmHg. After 20.4 hours total reaction time, 984 grams of hazy, pale-yellow liquid crude polyol product is recovered and acid number is measured to be 0.08 mg KOH/g. Hydroxyl number is measured to be 53.06 mg KOH/g. GPC analysis indicates the number average molecular weight "Mn" to be 1774, weight average molecular weight "Mw" to be 3627, and polydispersity to be 2.044. GPC also shows the presence of a significant low-molecular-weight fraction. The recovered product is found to contain 3.82 wt % OCE determined by GC analysis.

The crude polyol product is processed through a 4-inch diameter SPD unit at about 200° C. evaporator temperature and about 4 micron (0.004 mmHg) vacuum. The distillate stream removed by the SPD operation has about 7.0 wt % low-boiling fraction. The bottoms (product) is found to have number average molecular weight of 2484, hydroxyl value 45.17 mg KOH/g, and 0.45% OCE determined by GC analysis.

Example 2

A 2-liter round bottom flask is fitted with a heating mantle, magnetic stir bar, nitrogen sparge tube, and a 5-plate Oldershaw column with distillation head, condenser, and distillate receiver as in Example 1. The flask is charged with a reaction mixture comprising 438.4 grams adipic acid, 103.6 grams 1,4-butanediol and 657.8 grams of the same T-250 PTMEG as in Example 1. The reaction mixture is sparged with nitrogen for 30 minutes, and then heated to 200° C. reaction mixture with continuous nitrogen sparge. Water of reaction is condensed and collected in the distillate receiver. After 7.3 hours, the reaction mixture is sampled and acid number is found to be 22 mg KOH/g. Then 0.2 gram Tyzor® TPT 20B esterification catalyst is added. Reaction mixture temperature is held at 200° C. and nitrogen sparge is continued. After 10.7 hours total reaction time, acid number is measured to be 14 mg KOH/g. An additional 0.1 gram Tyzor® TPT 20B is then added. Reaction mixture temperature is held at 200° C. and nitrogen sparge is continued. After 17.5 hours total reaction time, acid number is measured to be 0.11 mg KOH/g. A 1076 gram quantity of crude polyol product is recovered and found to have a hydroxyl number of 39.00 mg KOH/g and viscosity 10,826 centistokes (cSt) at 25° C. The crude polyol product contains 3.22 wt % OCE determined by GC analysis.

The crude polyol product is then fed through a 2-inch diameter SPD unit at about 200° C. evaporator temperature and about 40 micron (0.04 mmHg) vacuum. The first separation stream removed by the SPD operation is about 3.5 wt % low-boiling fraction. The second separation stream recovered has a hydroxyl number 32.97 mg KOH/g and OCE content of 0.06 wt % determined by GC analysis.

As observed from the above examples, the present process demonstrated by Example 2 is very efficient for manufacturing copolyether ester polyol having an OCE content of less than about 2.0% by weight, for example from about 0.01 to about 1.8% by weight, from feedstock comprising PTMEG having a number average molecular weight of 350 g/mol or less, for example from about 200 to about 300 g/mol, and an oligomeric cyclic ether content of about 4.0% by weight or greater, for example from about 4.0 to about 10.0% by weight.

Example 3

A 5-liter round-bottom flask is fitted with a distillation takeoff, condenser and a mineral-oil bubbler as atmospheric-pressure vent. The flask is also fitted with an electric heating mantle, a magnetic stirrer, and a gas sparger tube to introduce nitrogen gas sub-surface during reaction. The flask is charged with 950 g adipic acid and 1850 g Terathane T-250 (containing 6.28% OCE). The charge is sparged with 100 standard cc/minute (sccm) nitrogen for 1 hour then heated to 200° C. mixture temperature while nitrogen sparge is continued at 100 sccm. A timer is started when heat is turned on. Water formed by the esterification reaction distills and is condensed and collected overhead. After 7.8 hours, the overhead receiver is found to contain 218 g of water and acid number of the reaction mixture is found to be 17.4 mg KOH/g. Nitrogen sparge rate is increased to 350 sccm and 0.45 g Tyzor® TPT 20B catalyst is added. After 25 hours, acid number is found to be 0.24 mg KOH/g and hydroxyl number is 37.05 mg KOH/g. After adding 49.27 g more T-250, the reaction mixture is held at 200° C. with 100 sccm nitrogen sparge for 3 hours. The final product is found to weigh 2590 g and has acid number 0.05 mg KOH/g and hydroxyl value 44.97 mg KOH/g.

The above procedure is repeated to yield a second batch of 2581 g product with acid number 0.07 mg KOH/g and hydroxyl value 43.87 mg KOH/g.

The two batches are combined to provide a feed material for SPD. The combined feed material is found to have number average molecular weight of 2544, acid number 0.06, hydroxyl value 44.1, and 4.9% OCE.

A total of 4877 g combined feed is processed at 2090 g/hr feed rate by short-path distillation to yield 277 g distillate and 4604 g bottoms (product). The feed is fed through a 2-inch diameter SPD unit at about 200° C. evaporator temperature and about 6.5 micron (0.0065 mmHg) vacuum. The distillate stream removed by the SPD operation has about 5.7 wt. % low-boiling fraction. The bottoms (product) is found to have number average molecular weight of 2840, acid number 0.05 mg KOH/g, hydroxyl value 39.51 mg KOH/g, and 0.18% OCE. Thus OCE content has been reduced by 96% compared to the combined feed. Analysis also shows that cyclic ester content of the product is reduced by about 28% compared to the feed. The overhead distillate is found to contain 80% OCE.

Example 4

A 5-liter round-bottom flask is fitted with a distillation takeoff, condenser and a mineral-oil bubbler as atmospheric-pressure vent. The flask is also fitted with an electric heating mantle, a magnetic stirrer, and a gas sparger tube to introduce nitrogen gas subsurface during reaction. The flask is charged with 1100 g adipic acid, 235 g 1,4-butanediol, and 1400 g Terathane® T-250 (containing 6.28% OCE). The charge is sparged with 200 standard cc/minute (sccm) nitrogen for 1 hour then heated to 200° C. mixture temperature while nitrogen sparge is continued at 100 sccm. A timer is started when heat is turned on. Water formed by the esterification reaction distills and is condensed and collected overhead. After 6 hours, the overhead receiver is found to contain 251 g of water and acid number of the reaction mixture is found to be 23 mg KOH/g. Nitrogen sparge rate is increased to 350 sccm and 0.45 g Tyzor® TPT 20B catalyst is added. After 29.6 hours, acid number is found to be 0.26 mg KOH/g and hydroxyl number is 26.5 mg KOH/g. After adding 37.3 g more 1,4-Butanediol, the reaction mixture is held at 200° C. with 350 sccm nitrogen sparge for 3 hours. The final product is found to weigh 2459 g and have acid number 0.07 mg KOH/g and hydroxyl value 43.6 mg KOH/g.

The above procedure is repeated to yield a second batch of 2454 g product with acid number 0.23 mg KOH/g and hydroxyl value 44.2 mg KOH/g.

The two batches are combined to provide a feed material for short-path distillation. The combined feed material is found to have number average molecular weight of 2559, acid number 0.15, hydroxyl value 43.9, and 3.85% OCE.

A total of 4549 g combined feed is processed at 1922 g/hr feed rate by short-path distillation to yield 193 g distillate and 4355 g bottoms (product). The feed is fed through a 2-inch diameter SPD unit at about 190'C evaporator temperature and about 4.0 micron (0.004 mmHg) vacuum. The distillate stream removed by the SPD operation has about 4.2 wt. % low-boiling fraction. The bottoms (product) is found to have number average molecular weight of 2794, acid number 0.15 mg KOH/g, hydroxyl value 40.16 mg KOH/g, and 0.22% OCE. The OCE content is reduced by 75% compared to the OCE content in Comparative Example 5 below using commercial T-250 with low OCE content. Analysis also shows that cyclic ester content of the product is reduced by about 24% compared to the feed. The overhead distillate is found to contain 81% OCE.

Example 5 (Comparative)

This example describes a polyester polyol made using a commercial-grade T-250 PTMEG with low OCE content. The commercial grade T-250 PTMEG, as used in this example, has the following specification;

| Mol. weight | 230-270 |
| Hydroxyl number | 416.6-487.8 |
| Alkalinity Number (meq OH/kg × 30) | −2.0-+1.0 |
| Colour (APHA) | <40 |
| Water (ppm) | <150 |
| Viscosity | (40° C.) 40-70 cP |

A 5-liter round-bottom flask is fitted with a distillation takeoff, condenser and a mineral-oil bubbler as atmospheric-pressure vent. The flask is also fitted with an electric heating mantle, a magnetic stirrer, and a gas sparger tube to introduce nitrogen gas subsurface during reaction. The flask is charged with 1100 g adipic acid, 250 g 1,4-butanediol, and 1393 g commercial grade Terathane® T-250 (containing 1.55% OCE). The charge is sparged with 100 standard cc/minute (sccm) nitrogen for 1 hour then heated to 200° C. mixture temperature while nitrogen sparge is continued at 100 sccm. A timer is started when heat is turned on. Water formed by the esterification reaction distills and is condensed and collected overhead. After 6.2 hours, the overhead receiver is found to contain 250 g of water and acid number of the reaction mixture is found to be 22.9 mg KOH/g. Nitrogen sparge rate is increased to 350 scorn and 0.45 g Tyzor® TPT 20B catalyst is added. After 31.2 hours, the acid number is found to be 0.12 mg KOH/g and hydroxyl number is 29.41 mg KOH/g. After adding 21.4 g more 1,4-Butanediol, the reaction mixture is held at 200° C. with 350 sccm nitrogen sparge for 3 hours. The final product is found to weigh 2428 g and has acid number 0.04 mg KOH/g, hydroxyl value 39.6 mg KOH/g, and 0.88% OCE.

All patents, patent applications, test procedures, priority documents, articles, publications, manuals, and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

While the illustrative embodiments of the invention have been described with particularity, it will be understood that various other modifications will be apparent to and may be readily made by those skilled in the art without departing from the spirit and scope of the invention. Accordingly, it is not intended that the scope of the claims hereof be limited to the examples and descriptions set forth herein but rather that the claims be construed as encompassing all the features of patentable novelty which reside in the present invention, including all features which would be treated as equivalents thereof by those skilled in the art to which the invention pertains.

What is claimed is:

1. A process for manufacturing copolyether ester polyol comprising: (1) providing feedstock comprising polytetramethylene ether glycol having a number average molecular weight of 350 g/mol or less and an oligomeric cyclic ether content of 4.0% by weight or more and a diacid composition selected from alpha-omega alkanedioic acids of formula $HO_2C$—$(CH_2)_n$—$CO_2H$, where n is from 2 through 16 to a reaction zone maintained at reaction conditions to produce a crude polyol product; (2) feeding the crude polyol product of step (1) to a separation zone at separation conditions to produce a first separation product having an oligomeric cyclic ether content of 2.0% by weight or greater, and a second separation product comprising copolyether ester polyol having an oligomeric cyclic ether content of less than 2.0% by weight; and (3) recovering the second separation product.

2. The process of claim 1 wherein the polytetramethylene ether glycol of step (1) has a number average molecular weight of from 200 to 300 g/mol, and oligomeric cyclic ether content of from about 4.0 to 10% by weight.

3. The process of claim 1 wherein copolyether ester polyol of the second separation product of step (2) has an oligomeric cyclic ether content of 1.8% by weight or less.

4. The process of claim 3 wherein copolyether ester polyol of the second separation product of step (2) has an oligomeric cyclic ether content of from 0.01 to 1.8% by weight.

5. The process of claim 2 wherein copolyether ester polyol of the second separation product of step (2) has an oligomeric cyclic ether content of 1.8% by weight or less.

6. The process of claim 1 wherein the diacid comprises succinic acid, glutaric acid, adipic acid, pimelic acid, suberic acid, azelaic acid, sebacic acid, undecanedioic acid, dodecanedioic acid, or a combination thereof.

7. The process of claim 1 wherein the feedstock of step (1) optionally comprises one or a combination of a diol composition, an oligomeric glycol, and an esterification catalyst.

8. The process of claim 7 wherein the optional diol composition is selected from alpha-omega alkanediols of formula HO—$(CH_2)_x$—OH, where x is from 2 through 18.

9. The process of claim 7 wherein the optional oligomeric glycol is selected from the group consisting of oligomeric ethylene glycols, oligomeric propylene glycols, ethoxylated glycols, diethylene glycol, triethylene glycol, tetraethylene glycol, dipropylene glycol, tripropylene glycol, and combinations thereof.

10. The process of claim 1 wherein the feedstock to step (1) comprises polytetramethylene ether glycol having a number average molecular weight of 300 g/mol or less and an oligomeric cyclic ether content of 4.0% by weight or more, adipic acid, 1,4-butanediol and an esterification catalyst.

11. The process of claim 1 wherein the reaction conditions of step (1) include a temperature of from 100 to 300° C., and pressure from 10 to 2000 mmHg.

12. The process of claim 1 wherein the separation zone of step (2) comprises apparatus for vacuum distillation or evaporation.

13. The process of claim 12 wherein the vacuum distillation apparatus comprises a short path distillation column.

14. The process of claim 12 wherein the evaporation apparatus comprises a wiped film evaporator.

15. The process of claim 1 wherein the separation conditions of step (2) include a temperature of from 125 to 250° C., and vacuum from 0.001 to 10 mmHg.

16. A process for manufacturing copolyether ester polyol comprising: (1) providing feedstock comprising polytetramethylene ether glycol having a number average molecular weight of 300 g/mol or less and an oligomeric cyclic ether content of from 4.0 to 10% by weight and a diacid composition selected from alpha-omega alkanedioic acids of formula $HO_2C$—$(CH_2)_n$—$CO_2H$, where n is from 2 through 16, to a reaction zone maintained at reaction conditions to produce a crude polyol product; (2) feeding the crude polyol product of step (1) to a separation zone at separation conditions to produce a first separation product having an oligomeric cyclic ether content of 2.0% by weight or greater, and a second separation product comprising copolyether ester polyol having an oligomeric cyclic ether content of from 0.01 to 1.8% by weight; and (3) recovering the second separation product.

17. The process of claim 16 wherein the polytetramethylene ether glycol of step (1) has a number average molecular weight of from 200 to 300 g/mol.

18. The process of claim 16 wherein the diacid comprises succinic acid, glutaric acid, adipic acid, pimelic acid, suberic acid, azelaic acid, sebacic acid, undecanedioic acid, dodecanedioic acid, or a combination thereof.

19. The process of claim 16 wherein the feedstock of step (1) optionally comprises one or a combination of a diol composition, an oligomeric glycol, and an esterification catalyst.

20. The process of claim 19 wherein the optional diol composition is selected from alpha-omega alkanediols of formula HO—$(CH_2)_x$—OH, where x is from 2 through 18.

21. The process of claim 16 wherein the reaction conditions of step (1) include a temperature of from 100 to 300° C., and pressure from 10 to 2000 mmHg.

22. The process of claim 16 wherein the separation conditions of step (2) include a temperature of from 125 to 250° C., and vacuum from 0.001 to 10 mmHg.

* * * * *